United States Patent
Kawasumi et al.

[19]

[11] Patent Number: 5,979,162
[45] Date of Patent: Nov. 9, 1999

[54] VEHICLE BRAKE BOOSTER APPARATUS

[75] Inventors: Satoshi Kawasumi, Takahama; Tomoo Ogura, Chiryu; Yuzuru Sugiura, Anjo, all of Japan

[73] Assignee: Aisin Seiki Kabushiki Kaisha, Kariya, Japan

[21] Appl. No.: 08/964,114

[22] Filed: Nov. 5, 1997

[30] Foreign Application Priority Data

Nov. 5, 1996 [JP] Japan .................................. 8-292525

[51] Int. Cl.[6] .................................................. B60T 13/20
[52] U.S. Cl. ............................................ 60/552; 91/369.1
[58] Field of Search ............................. 91/369.1, 376 R; 60/552

[56] References Cited

U.S. PATENT DOCUMENTS

| | | | |
|---|---|---|---|
| 2,883,970 | 4/1959 | Stelzer | 91/376 R |
| 2,936,590 | 5/1960 | Rockwell | 91/376 R |
| 3,017,866 | 1/1962 | Stelzer | 91/376 R |
| 5,161,451 | 11/1992 | Fecher | 91/376 R |
| 5,190,125 | 3/1993 | Suzuki et al. | |

*Primary Examiner*—F. Daniel Lopez
*Attorney, Agent, or Firm*—Burns, Doane, Swecker & Mathis, LLP

[57] ABSTRACT

A vehicle brake booster apparatus includes a housing and a power piston positioned within the interior of the housing to divide the interior into a first pressure chamber and a second pressure chamber, with the power piston being movable in response to a pressure difference between the second pressure chamber and the first pressure chamber. An axially movable input rod extends outwardly from the power piston and is adapted to be operatively connected to a brake pedal. An axially movable output rod extends outwardly from the housing and is adapted to be operatively connected to a master cylinder. An axially movable valve plunger is mounted within the power piston and is operatively connected to the input rod. A control valve is disposed within the power piston and controls the pressure difference between the first pressure chamber and the second pressure chamber. A reaction device is also provided between the housing and the input rod for applying the reaction force produced by the master cylinder to the input rod.

19 Claims, 3 Drawing Sheets

VEHICLE BRAKE BOOSTER APPARATUS

FIELD OF THE INVENTION

The present invention generally relates to vehicle brake systems. More particularly, the present invention pertains to a vacuum type brake booster apparatus for use in a vehicle brake system.

BACKGROUND OF THE INVENTION

U.S. Pat. No. 5,190,125 discloses a vehicle brake booster apparatus which has a reaction plate disposed between an output rod and a power piston. This apparatus also includes a valve mechanism which is arranged in the power piston. The valve mechanism controls the pressure differential between a constant pressure chamber and a variable pressure chamber and generates a control force of a master cylinder. The apparatus receives a reaction force from the master cylinder which is then transmitted to the power piston and the input rod in a predetermined ratio with a reaction mechanism (reaction disc).

The apparatus generates a correct brake pedal stroke in response to the piston stroke movement of the master cylinder. Further, the apparatus generates a reaction force of the brake pedal and a boosted force in response to the output of the reaction mechanism.

In brake boosters of this type, it is often desirable to improve the control response of the brake booster. One way of improving the control response is to design a large clearance and/or a large space in the control valve. However, in this apparatus, the reaction mechanism restrains the operation of the control valve and cannot produce a quick operation.

A need exists therefore for an improved brake booster apparatus that is able to overcome the above drawbacks.

It would be desirable to provide a brake booster apparatus which is able to produce a precise reaction force of the brake pedal in response to the amount pedal stroke operation.

It would also be desirable to provide a brake booster apparatus which can produce desirable output characteristics in response to the pedal stroke amount.

It would be further desirable to provide a brake booster apparatus possessing a large clearance between the atmospheric air and the negative pressure chamber.

SUMMARY OF THE INVENTION

In light of the foregoing, the vehicle brake booster apparatus of the present invention includes a housing having an interior for being fixed to a vehicle body, a power piston positioned within the interior of the housing to divide the interior into a first pressure chamber and a second pressure chamber, the power piston being movable in response to a pressure difference between the second pressure chamber and the first pressure chamber. An axially movable input rod extends outwardly from the power piston for being operatively connected to a brake pedal. An axially movable output rod extends outwardly from the housing for being operatively connected to a master cylinder. An axially movable valve plunger is mounted within the power piston and is operatively connected to the input rod. A control valve controls the pressure difference between the first pressure chamber and the second pressure chamber. A leading device generates a leading force which is applied to the input rod or the brake pedal. The leading device is disposed between the housing and the input rod. The apparatus is designed so that the reaction force from the master cylinder is transmitted to the power piston when a pressure value in the second pressure chamber is less than a maximum pressure value.

According to another aspect of the invention, a brake booster apparatus for a vehicle includes a housing mountable on a vehicle body, a power piston positioned within the interior of the housing to divide the housing interior into a first pressure chamber and a second pressure chamber so that the power piston is movable in response to a pressure differential between the second pressure chamber and the first pressure chamber, an axially movable valve plunger mounted within the power piston, and an axially movable input rod that is adapted to be connected to a brake pedal. The input rod is operatively connected to the valve plunger. An axially movable output rod which is adapted to be connected to a master cylinder receives the reaction force produced by the master cylinder during operation of the brake booster apparatus. The output rod is directly connected to the power piston so that the reaction force is directly applied to the power piston. A control valve controls pressure to create a pressure differential between the first pressure chamber and the second pressure chamber.

In accordance with another aspect of the invention, a brake booster apparatus for a vehicle includes a housing mountable on a vehicle body, a power piston positioned within the interior of the housing to divide the interior into a first pressure chamber and a second pressure chamber so that the power piston is movable in response to a pressure differential between the second pressure chamber and the first pressure chamber, an axially movable input rod that is adapted to be connected to a brake pedal, and an output rod that is adapted to be connected to a master cylinder. The input rod is operatively connected to the power piston and the input rod receives a reaction force produced by the master cylinder during operation of the brake booster apparatus. A biasing device is operatively associated with the input rod and is positioned exteriorly of the power piston for applying a leading force to the input rod. A control valve controls pressure to create a pressure differential between the first pressure chamber and the second pressure chamber.

BRIEF DESCRIPTION OF THE DRAWING FIGURES

Other features and characteristics associated with the present invention will be more readily appreciated from the following detailed description considered with reference to the accompanying drawing figures in which like elements are designated by like reference numerals and wherein.

DETAILED DESCRIPTION OF THE PREFERRED EMBODIMENT

Figure 1:
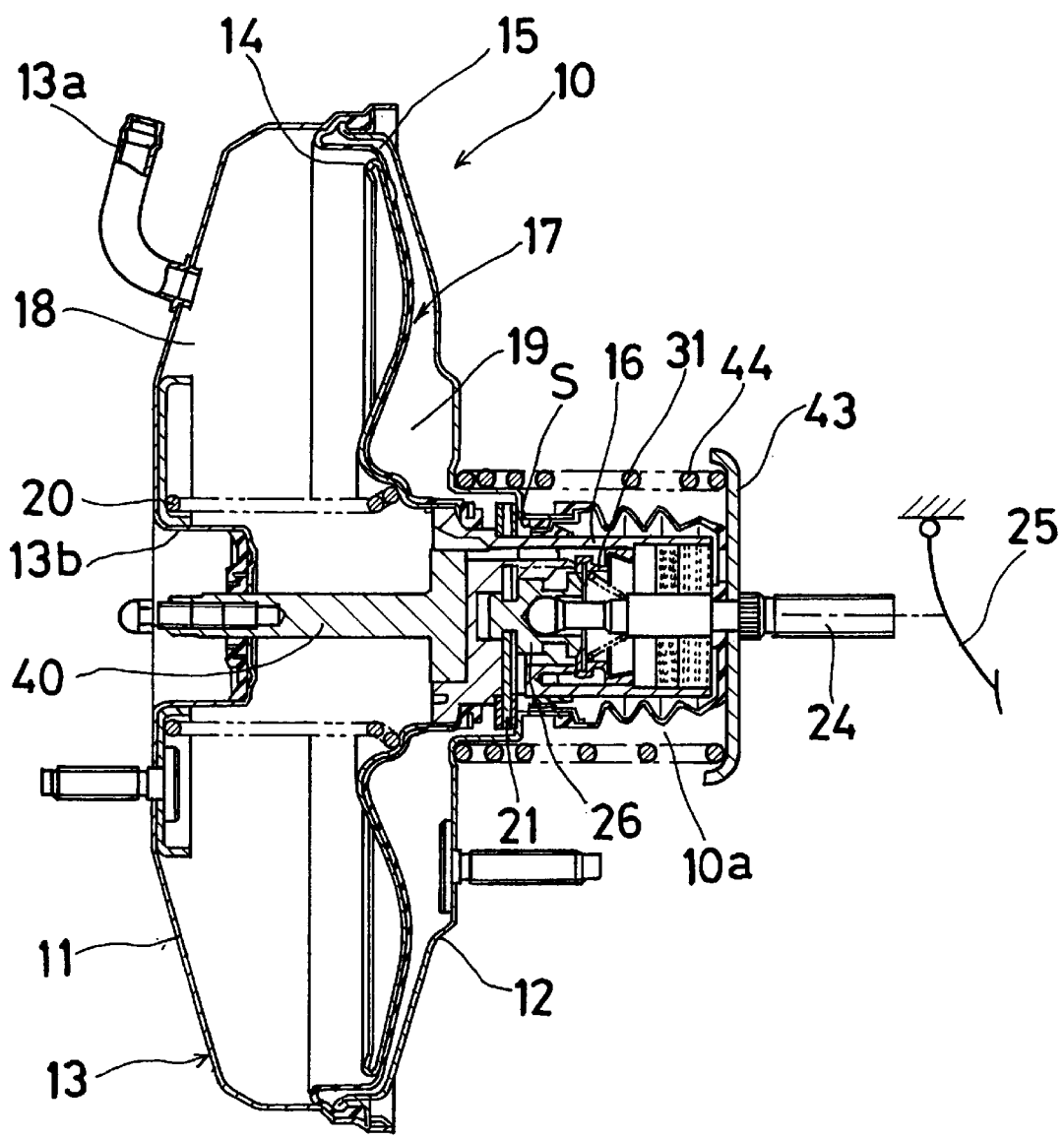
FIG. 1 is a cross sectional view of the brake booster in accordance with the present invention.
Figure 2:
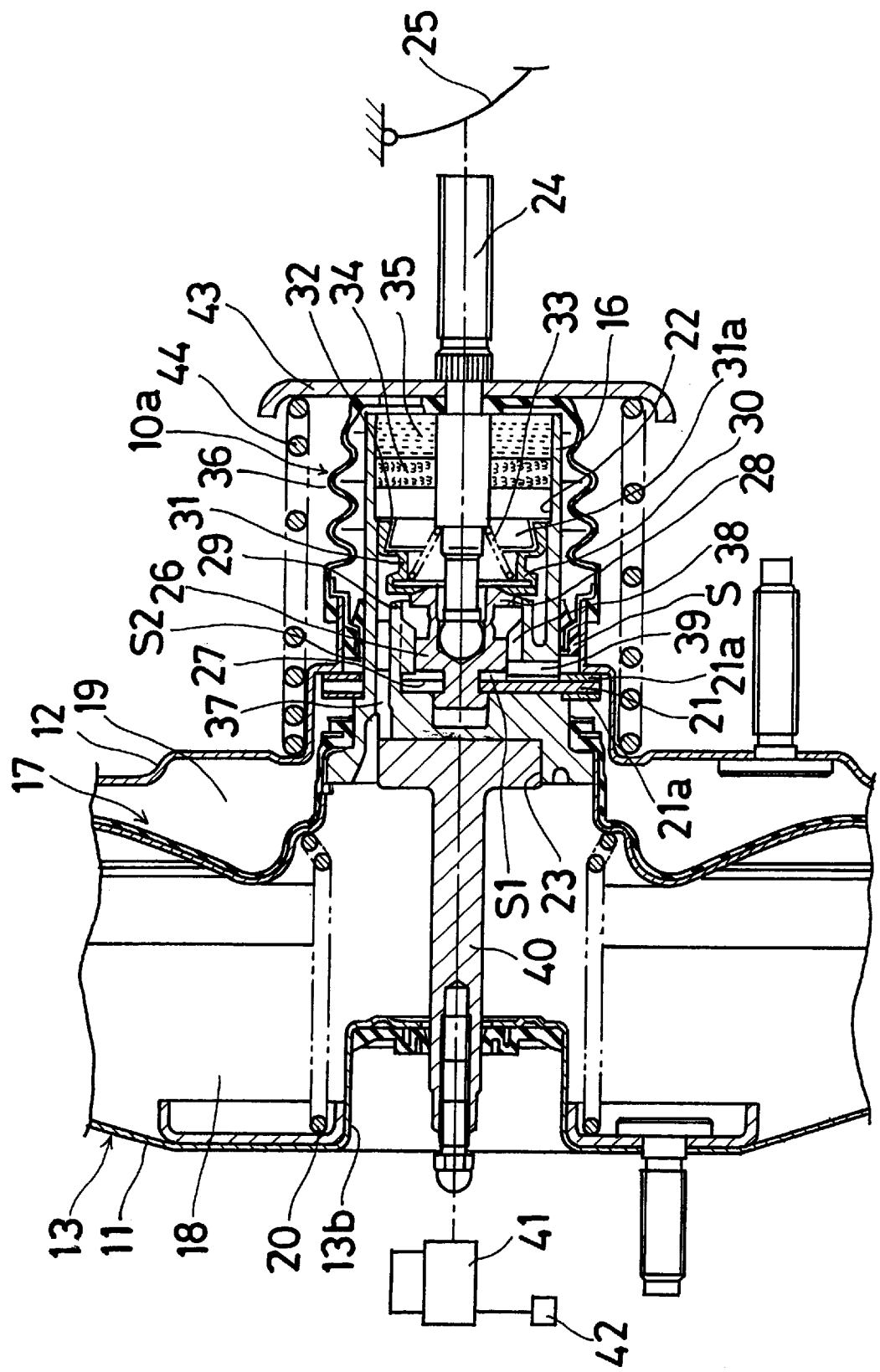
FIG. 2 is an enlarged cross-sectional view of a portion of the brake booster shown in FIG. 1.

With reference to the drawing figures, FIG. 1 is a longitudinal cross-sectional view of the vehicle brake booster taken along the direction of the input/output shaft of a brake booster apparatus according to an embodiment of the present invention while FIG. 2 illustrates on an enlarged scale a portion of the brake booster depicted in FIG. 1. As seen with reference to the FIGS. 1 and 2, the brake booster 10 includes a projecting portion 10a on its input side that communicates with atmospheric air and a substantially conically-shaped housing 13 on its output side. The housing 13 has an inlet connector 13a communicating with a negative pressure source such as the intake manifold of the engine.

The housing 13 is comprised of a front shall 11 and a rear shell 12 that are connected to one another along their outer periphery to define a pressure chamber within the interior of the housing. The front shell 11 has a concave portion 13b for accommodating a master cylinder 41. A brake cylinder 42 is operatively connected to the master cylinder 41. The master cylinder 41 receives the output force of the brake booster and generates a brake pressure in response to the depression of the brake pedal 25 which is connected to an input rod 24.

Disposed within the housing 13 is a power piston 17 which is composed of a plate 14, a diaphragm 15 and a piston body 16. The plate 14 and the diaphragm 15 divide the interior of the pressure chamber into a constant pressure chamber 18 and a variable pressure chamber 19. The constant pressure chamber 18 constitutes a first pressure chamber while the variable pressure chamber 19 constitutes a second pressure chamber.

The outer peripheral part of the diaphragm 15 is supported between the front shall 11 and the rear shell 12 of the housing 13 for maintaining air-tight conditions within the variable pressure chamber 19 and the constant pressure chamber 18. The inner peripheral part of the plate 14 and the inner peripheral part of the diaphragm 15 are supported on the outer periphery of the piston body 16 for maintaining air-tightness of the variable pressure chamber 19 and the constant pressure chamber 18. As a result, the constant pressure chamber 18 which is in communication with the negative pressure source by way of the inlet connector 13a is always kept under negative pressure conditions. A seal S is disposed between the rear shell 12 and the piston body 16 for maintaining air-tight conditions within the variable pressure chamber 19 and the constant pressure chamber 18.

Disposed within the piston body 16 are several air filters 34, 35, the input rod 24, a valve plunger 26, a control valve 31 and an output rod 40. The valve plunger 26 is slidably arranged in an inner bore of the piston body 16 and a key 21 is provided to restrict or limit the movement of the valve plunger 26. The key 21 is positioned so that it extends into a recessed portion 27 of the valve plunger 26. The recessed portion 27 possesses an axially extending width that is greater than the thickness of the key 21.

The end portion of the input rod 24 is provided with a ball joint portion that is tightly secured to the valve plunger 26 through crimping. The oppositely facing surfaces of the key 21 are each provided with an absorber 21a, 21a to absorb forces as the key 21 moves axially back and forth and contacts a radially extending portion of the outer shell 12 and a shoulder provided on the piston body 16.

A return spring 20 is interposed under compression between the front shell 11 and the inner peripheral portion of the plate 14. The return spring 20 pushes the power piston 17 towards the input side (i.e., towards the right as seen with reference to FIG. 1). A stroke movement region S1 is defined within the recessed portion 27 of the valve plunger 26 between the valve plunger 26 and the key 21. The movement of the valve plunger 26 is determined within this stroke movement region S1.

The key 21 is slidably mounted on the piston body 16 and the amount of slide stroke movement between the key 21 and the piston body is defined as S2. Therefore, the valve plunger 26 is able to slide in the forward and backward directions against the piston body 16 by an amount represented by the value S1+S2.

An annular or ring shaped valve seal 28 is formed at the front end portion of the valve plunger 26 which faces towards the input side of the booster (i.e., towards the right in FIGS. 1 and 2). A similar annular or ring shaped valve seal 29 is formed at the front end portion of the inner tube portion of the piston body 16.

The control valve 31, which is disposed in a stepped bore 22 of the piston body 16, is provided at its front end with an annular valve seat 30 which faces the valve seals 28, 29. The rear end of the control valve 31 is fixed in an air-tight manner to the inner surface of the piston body 16 by a retainer 32. A spring 33 under compression is positioned between the valve seat 30 and the input rod 24 to urge the valve seat 30 towards the output side of the booster (i.e., towards the left as seen with reference to FIGS. 1 and 2).

An inner space 31a, which is bounded by the control valve 31, the piston body 16 and the air filters 34, 35, communicates with atmospheric air by way of a dust boot 36 positioned radially outwardly of the piston body 16. An outer space of the seal 29 communicates with the constant pressure chamber 18 by way of a path 37 which is formed in the piston body 16. An inner space of the seal 29 communicates with the variable pressure chamber 19 by way of several paths 38, 39 which are formed in the piston body 16.

The output rod 40 is disposed at the front end portion of the piston body 16 and directly engages or contacts a recessed portion 23 of the piston body 16. The output rod 40 passes through and is slidably connected to the front shell 11 in an air-tight manner as shown in FIGS. 1 and 2. The output rod 40 transmits the movement of the piston body 16 and the generated force to the master cylinder 41. The master cylinder 41 then provides brake pressure to the brake cylinder 42.

A spring 44 is disposed between a retainer 43 and the rear shell 12. The retainer 43 is tightly mounted on and secured to the input rod 24. The spring 44 urges the input rod 24 towards the input side of the brake booster (i.e., towards the right as seen with reference to FIG. 2).

FIGS. 1 and 2 illustrates the brake booster 10 in its non-operational condition. In this condition, the power piston 17 contacts the rear shell 12 through the key 21. The movement of the valve plunger 26 is regulated by the key 21. In the non-operational condition, the valve seal 28 is in contact with the valve seat 30 and a clearance is established between the valve seal 29 and the valve seat 30. In this condition, the variable pressure chamber 19 communicates with the constant pressure chamber 18 through the paths 39, 38, the inner space of the valve seal 29, the outer space of the valve seal 29, and the path 37. Consequently, the variable pressure chamber 19 is kept under negative pressure conditions and the brake booster does not operate the master cylinder 41.

When the brake pedal 25 is depressed with a force that exceeds the leading force generated by the spring 44, the spring 44 is compressed, and the input rod 24 and the valve plunger 26 move axially towards the output side of the brake booster (i.e., towards the left as seen with reference to the illustration in FIG. 2). During this axial movement of the valve plunger 26, the valve seat 30 of the control valve 31 engages the valve seal 29 thus interrupting communication between the variable-pressure chamber 19 and the constant pressure chamber 18. Continued axial movement of the valve plunger 26 also causes the valve seat 30 of the control valve 31 to disengage from the valve seal 28 of the valve plunger 26, thus causing the variable pressure chamber 19 to communicate with the atmosphere. Atmospheric air thus flows into the variable pressure chamber 19 and the power piston 17 is driven by the pressure differential that results between the variable pressure chamber 19 and the constant pressure chamber 18. As a result, a boosted force is generated to the master cylinder through the output rod 40.

When the pressure level in the variable pressure chamber 19 reaches atmospheric level, the boosted force increases in response to the pressure difference between the constant pressure chamber 18 and the variable pressure chamber 19. If the brake pedal 25 is depressed after the pressure level in the variable pressure chamber 19 reaches atmospheric pressure, the valve plunger 26 contacts the power piston 17 through the key 21. The depression force of the brake pedal 25 is thus directly transmitted to the power piston 17 and the boosted force and the depressing force of the brake pedal 25 are transmitted to the output rod 40.

The loading force associated with the spring 44 increases in response to depression of the brake pedal 25 and the movement of the input rod 24. When the loading force of the spring 44 and the depression force of the brake pedal 25 balance one another, the input rod 24 and the valve plunger 26 stand still. In accordance with the forward movement of the power piston 17, the clearance between the valve seat 30 and the valve seal 28 is decreased by the movement of the power piston 17 and the spring force of the spring. Further, the valve seat 30 engages with the valve seal 28. In this condition, communication between the variable pressure chamber 19 and the atmosphere is cut off, and movement of the power piston 17 ceases so that the power piston 17 stands still.

When the brake pedal 25 is released, the valve plunger 26 moves towards the input side of the brake booster (i.e., towards the right as seen with reference to FIG. 2) by the biasing force of the spring 44. The valve seat 30 of the control valve 31 also moves towards the input side of the brake booster (i.e., towards the right as seen with reference to FIG. 2), whereupon the valve seat 30 moves away from the valve seal 29 so that a clearance is established between the valve seat 30 and the valve seal 29. Therefore, the variable pressure chamber 19 and the constant pressure chamber 18 communicate with each other and the air in the variable pressure chamber 19 is released. Furthermore, the power piston 17 and the output rod 40 return to the initial position shown in the FIGS. 1 and 2 by the reaction force of the master cylinder 41.

In this embodiment, the loading force which is applied to the valve plunger 26 is only generated by the spring 44. The reaction force from the master cylinder 41 is not applied to the valve plunger 26. When a sudden operating force is applied to the brake pedal 25, the valve plunger 26 moves towards the output side of the brake booster (i.e., towards the left as seen with reference to FIG. 2) as a result of contact with the key 21 and a large amount of clearance is established between the valve seal 28 and the valve seat 30. Consequently, the power piston 17 moves rapidly in the direction towards the output side of the brake booster.

Figure 3:
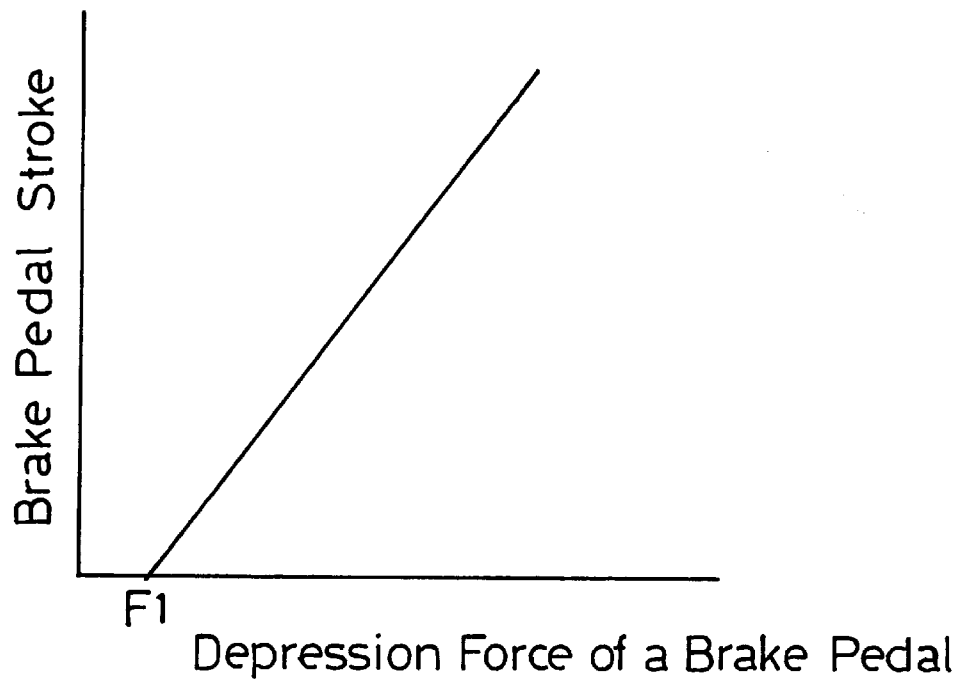
FIG. 3 is a graph illustrating the relationship between the depression force of the brake pedal and the brake pedal stroke of the brake booster of the present invention.
Figure 4:
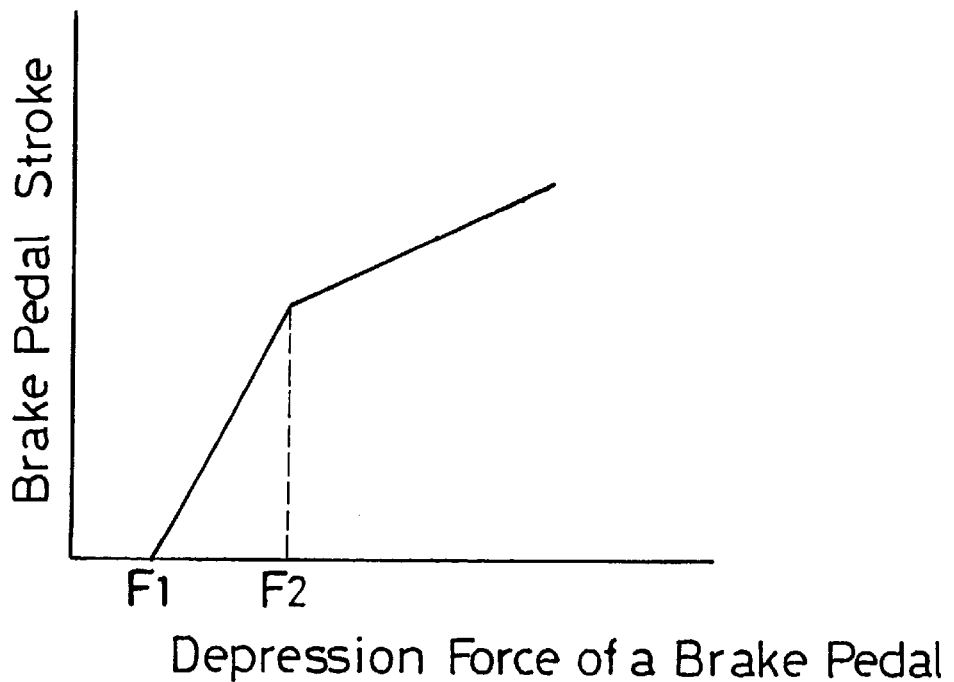
FIG. 4 is a further graph illustrating the relationship between the depression force of the brake pedal and the brake pedal stroke of the brake booster of the present invention.

The leading force generated by the spring 44 is applied to the brake pedal 25. If the spring 44 possesses linear spring characteristics between the time at which loading of the spring is initiated by depression of the brake pedal and the time of complete deformation of the spring, the relationship between the depression force of the brake pedal and the pedal stroke is represented in FIG. 3. The force value F1 in FIG. 3 represents the initial setting force of the spring 44. If the spring 44 has nonlinear spring characteristics between initial loading and complete deformation, the relationship between the depression force of the brake pedal and the pedal stroke is represented in FIG. 4. The spring constant between the values F1 and F2 is bigger than the spring constant beyond F2. It is possible to produce the relationship between the depression force of the brake pedal and the pedal stroke represented in FIG. 4 by using a spring 44 having two different spring constants so that the spring possesses two different stages of spring characteristics. Further, it is possible to use a combination of several springs to produce the reaction force of the brake pedal 25. It is also possible to utilize an elastic material(s) instead of, or in combination with, the spring(s). It is possible to arrange the elasticity material(s) and/or the spring(s) between the brake pedal 25 and the vehicle body.

It should also be understood that compressed air can be utilized to establish the pressure differential between the first and the second pressure chambers. In such a situation, the constant pressure chamber 18 or first pressure chamber would be in communication with the atmosphere while the variable pressure chamber 19 or second pressure chamber would be in communication with a compressed air source.

The present invention provides a brake booster apparatus having a quick response. The reaction force produced by the master cylinder during operation of the brake booster apparatus is transmitted to the input rod by way of the output rod 40, the power piston 17 and the spring 44. The apparatus is designed so that the output rod directly contacts the power piston and so the reaction force is directly transmitted from the output rod to the power piston. Thus, there is no reaction disk between the valve plunger and the output rod. Consequently, the responsiveness of the brake booster apparatus of the present invention is improved relative to other known constructions.

The principles, various embodiments, and modes of operation of the present invention have been described in the foregoing specification. However, the invention which is intended to be protected is not to be construed as limited to the particular disclosed embodiments. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake booster apparatus for a vehicle comprising:

a housing mountable on a vehicle body, the housing having an interior;

a power piston positioned within said interior of said housing to divide said interior into a first pressure chamber and a second pressure chamber, said power piston being movable in response to a pressure differential between said second pressure chamber and said first pressure chamber;

an axially movable valve plunger mounted within said power piston;

an axially movable input rod for being connected to a brake pedal, said input rod being operatively connected to said valve plunger;

an axially movable output rod operatively associated with said power piston and connectable to a master cylinder;

a control valve for controlling pressure to create a pressure differential between said first pressure chamber and said second pressure chamber;

loading means for applying a loading force to said input rod, said loading means being elastic and transmitting an input force applied to said input rod to said housing;

said input rod being biased by only said loading means at least while the pressure differential between the first pressure chamber and the second pressure chamber is generated.

2. A brake booster apparatus for a vehicle as set forth in claim 1, wherein said first pressure chamber is connected to an inlet connector for being connected to a negative pressure source, said second pressure chamber being adapted to communicate with atmosphere by said control valve.

3. A brake booster apparatus for a vehicle as set forth in claim 1, wherein said power piston is directly engaged with said output rod.

4. A brake booster apparatus for a vehicle as set forth in claim 1, including a key slidably mounted on said valve plunger and movable with respect to said power piston.

5. A brake booster apparatus for a vehicle as set forth in claim 4, wherein said key is mounted in a recess provided in said valve plunger, said recess having an axial width greater than a thickness of the key to define a predetermined movement stroke for the key.

6. A brake booster apparatus for a vehicle as set forth in claim 5, wherein said key is movable over a predetermined movement stroke with respect to said power piston.

7. A brake booster apparatus for a vehicle as set forth in claim 1, wherein said loading means includes a coil spring disposed under compression between said housing and a retainer which is fixed to said input rod.

8. A brake booster apparatus for a vehicle comprising:

a housing mountable on a vehicle body, the housing having an interior;

a power piston positioned within said interior of said housing to divide said interior into a first pressure chamber and a second pressure chamber, said power piston being movable in response to a pressure differential between said second pressure chamber and said first pressure chamber;

an axially movable input rod for being connected to a brake pedal, said input rod being operatively connected to said power piston;

an axially movable output rod connectable to a master cylinder, the output rod receiving a reaction force produced by the master cylinder during operation of the brake booster apparatus in a direction toward the input rod; and a control valve for controlling pressure to create the pressure differential between said first pressure chamber and said second pressure chamber;

the reaction force from the master cylinder being prevented from being transmitted from the output rod to the input rod at least until pressure in said second pressure chamber reaches a maximum pressure generated in said second pressure chamber.

9. A brake booster apparatus for a vehicle as set forth in claim 8, wherein the reaction force from said master cylinder is canceled by said power piston at least until the pressure in said second pressure chamber reaches a maximum pressure generated in said second pressure chamber.

10. A brake booster apparatus for a vehicle as set forth in claim 8, including biasing means positioned between the housing and a retainer that is connected to the input rod.

11. A brake booster apparatus for a vehicle as set forth in claim 8, including an axially movable valve plunger mounted within said power piston and a key slidably mounted on said valve plunger and movable with respect to said power piston.

12. A brake booster apparatus for a vehicle as set forth in claim 11, wherein said key is mounted in a recess provided in said valve plunger, said recess having an axial width greater than a thickness of the key to define a predetermined movement stroke for the key.

13. A brake booster apparatus for a vehicle comprising:

a housing mountable on a vehicle body, the housing having an interior;

a power piston positioned within said interior of said housing to divide said interior into a first pressure chamber and a second pressure chamber, said power piston being movable in response to a pressure differential between said second pressure chamber and said first pressure chamber;

an axially movable valve plunger mounted within said power piston:

a stopper for regulating movement of said valve plunger against said power piston by a predetermined stroke:

an axially movable input rod for being connected to a brake pedal, said input rod being operatively connected to said power piston;

an axially movable output rod operatively associated with said power piston and connectable to a master cylinder;

a control valve for controlling pressure to create the pressure differential between said first pressure chamber and said second pressure chamber in response to movement of said valve plunger;

a reaction force from said master cylinder being prevented from being transmitted to said input rod at least until said stopper regulates movement of the valve plunger for creating said pressure differential.

14. A brake booster apparatus for a vehicle as set forth in claim 13, wherein said stopper is a key slidably mounted on said valve plunger and movable with respect to said power piston.

15. A brake booster apparatus for a vehicle as set forth in claim 13, including a key slidably mounted on said valve plunger and movable with respect to said power piston, said input rod being connected to said output rod by way of said valve plunger.

16. A brake booster apparatus for a vehicle as set forth in claim 15, wherein said key is mounted in a recess provided in said valve plunger, said recess having an axial width greater than a thickness of the key to define a predetermined movement stroke for the key.

17. A brake booster apparatus for a vehicle as set forth in claim 13, including a biasing device positioned between the housing and a retainer that is connected to the input rod.

18. A brake booster apparatus for a vehicle as set forth in claim 17, wherein said biasing device is a spring.

19. A brake booster apparatus for a vehicle as set forth in claim 13, wherein the reaction force from said master cylinder is canceled by said power piston at least until said stopper regulates the movement of said valve plunger for creating the differential pressure.

* * * * *